June 22, 1965   E. L. McKENZIE   3,190,178
REFLEX-REFLECTING SHEETING
Filed June 29, 1961

INVENTOR
EUGENE L. McKENZIE
BY
Carpenter, Abbott, Coulter & Kinney
ATTORNEYS

# United States Patent Office 3,190,178
Patented June 22, 1965

3,190,178
REFLEX-REFLECTING SHEETING
Eugene L. McKenzie, North St. Paul, Minn., assignor to Minnesota Mining and Manufacturing Company, St. Paul, Minn., a corporation of Delaware
Filed June 29, 1961, Ser. No. 120,680
5 Claims. (Cl. 88—82)

This invention relates to beaded "high brilliancy" reflex-reflecting sheeting effective as a reflex-reflector of light under all weather conditions, whether the surface thereof is wet or dry.

The invention further relates to a novel method for making the beaded reflex-reflecting sheeting hereof.

Reflex-reflection of light has now come to be a well-recognized concept referring to the ability of a surface to return light back toward its source even though the incident beam may strike the surface at an angle other than normal. Particularly efficient beaded reflex-reflectors of the "high brilliancy" type are disclosed and claimed in Gebhard et al. U.S. Patent No. 2,326,634, here incorporated by reference. Characteristically, these structures contain a layer of lens elements exposed to an interface of air, with the lense elements preferably having a refractive index ($n_D$) between about 1.7 and 2.0 maximum reflexive light return. An unfortunate drawback of "high brilliancy" air-interface exposed-lens structures, however, has for years been the fact that reflex-reflective light reurn is blanked out when the lenticular surface of exposed lenses is covered with water.

A solution to the problem of preparing beaded reflex-reflectors which are effective to return light toward its source even though the incident beam may strike the surface at angle other than normal, whether the surface of the structure is wet or dry, is set forth in Palmquist et al. Patent No. 2,407,680. While the Palmquist et al. teaching is very effective to provide brilliant reflex-reflection of light under wet or dry conditions, the maximum brilliancy of reflex-reflective light return for such sheeting is not as great as that higher brilliancy of reflex-reflection possible when using exposed-lens structures of the type, for example, taught in Gebhard et al.

The instant invention, for the first time insofar as I am aware, provides cuttable reflex-reflecting sheeting having so-called "exposed-lens" construction, having the accompanying extraordinarily "high brilliance" exhibited by such constructions, and having the ability to serve as a durable high brilliancy reflex-reflector under a variety of weather conditions, regardless of whether or not the cut sheeting is dry or covered with a film of water, or even immersed in water. In terms of light return, all sheet products of the invention exhibit a brightness of light return, as measured by a photometer, at least 400 times greater than that light return from a conventional white paint film. Products having protometer readings in excess of 1,000 times that for a white paint have been formed according to the teachings hereof.

The sheeting hereof contains a plurality of hermetically isolated groups of exposed-lens-type reflex-reflecting complexes occupying near maximum optical surface area of the sheeting. This sheeting may be cut to various sizes by sign converters without disrupting more than a fractional area of the reflex-reflecting complexes along edge portions of the cut. The structure of my sheeting includes a transparent cover film hermetically sealed over the front face of an exposed-lens sheeting according to a pattern which serves to encapsulate and isolate the exposed-lens portions of discrete groups of beaded reflex-reflecting complexes from other groups thereof in the exposed-lens structure. Accomplishing this without unsightly or erratic flooding of the exposed portions of beads or spheres of the exposed lens structure, while at the same time maintaining maximum exposure of beaded reflex-reflecting complexes for the reflex-reflecting function, has heretofore remained an unsolved problem.

It, of course, is old to place a transparent cover film or plate over the lenticular surface of beaded exposed-lens-type reflex-reflectors; and such an expedient is discussed in Palmquist et al. U.S. Patent No. 2,407,680. A transparent cover film or plate does not alter the lens action of the beads of an exposed-lens structure, since the beads still contact at their front surfaces and thus no interference with the refraction of light at each front bead surface is created. Sealing of the edges of such structures has heretofore been difficult to accomplish without uncontrolled interference with the necessary exposed-lens feature. Even assuming the edges of such a structure are sealed satisfactorily, one still is left with a sheet article which cannot subsequently be cut as desired into a different shape for sign use, except by destroying edge-seals and making it necessary to seal the cut edges anew. Should satisfactory edge-sealing under field conditions be accomplished, resultant shaps for sign use are nevertheless relatively easily rendered useless if punctured ever so slightly during application to a sign base, or if punctured at any time later by vandals. As will further be explained below, a path for moisture to enter between a cover film and an underlying layer of air-exposed lens elements leaves one with a sign element quickly rendered worthless in practical use applications.

In the recently issued Hodgson, Jr. et al. U.S. Patent No. 2,948,191, it is suggested that a transparent cover film over a layer of exposed lenses or beads of a reflex-reflector should be maintained in fixed relationship to the reflecting material of the reflector as well as out of contact with the bead lens elements of the structure by means of a plurality of anchoring points distributed over the area of the reflecting material. One means suggested by Hodgson, Jr. et al. for accomplishing this is that of using a plurality of spaced apart beads of somewhat larger size than the beads relied upon for lens action in the structure, and anchoring the cover film to the spaced apart larger beads in the layer. This expedient, of course, serves solely to elevate the cover film above the beaded lens elements of the structure in a scattered point fashion without in any way protecting the lens elements from contamination with water, which latter would inherently seep between the cover film and lens elements from edge portions of the sheeting in the event of rain, and remain entrapped for relatively long periods thereafter because of capillarity. Varying degrees of moisture contamination underneath the cover film of such structures also occur during the usual change of conditions taking place from daytime, where higher temperatures prevail, into nighttime, where lower temperatures and higher humidity prevails and water condensation is apt to occur; and this at the very time reflex-reflection of high brilliancy is most critically necessary. Once contaminated with water, the reflex-reflecting function of air-interference exposed-lens structures is essentially blacked out, inasmuch as the difference in refractive index between water and that of the sphere lenses or beads of the layer in insufficient for effective light return where the beads of the layer have a refractive index as necessary for brilliant light return when exposed to an interface of air. (Beads having a refractive index of about 2.3 to 2.7 are needed for reasonably efficient reflex-reflection where their surfaces are covered with water, whereas beads between about 1.7 and 2.0 refractive index give best results when exposed to air.)

Another means suggested in the Hodgson, Jr. et al. patent for creating a number of anchoring points to maintain a transparent cover film in fixed relationship to the reflecting material of a reflex-reflector, as well as out of contact with beaded lens elements thereof, involves that of using screen materials (such as vinyl screening, nylon screening, coarsely woven fabrics such as cheesecloth, metal screening, or the like) as a grid work or mesh between the reflecting material and transparent cover film, and sealing the transparent cover film to the screening by tacking it to the points of elevation in the screening formed by the weave thereof. Such anchoring, as in the case of that formed by using larger beads, results in the formation of a structure readily contaminated by moisture penetration between the cover film and air-exposed lens elements, as may be demonstrated by immersing the structure in water, or by exposing its outdoors for a period of time to the changes of moisture conditions taking place during repeated daytime-nighttime cycling. The generally higher daytime temperatures tend to cause air between the cover film and air-exposed beads to expand, and then escape into adjacent "cells" and out the edges of the structure by passing through pores or openings between overlapped fibers or screening, while at the same time tending to push the cover film outwardly from the beads of the structure. Cooler nighttime conditions cause the air in the structure to contract and draw in (through the route taken for air escape) night air usually heavily laden with moisture. Each day this procedure is repeated results in additional moisture intake between the cover film and beads; and after a relatively short period of time, the moisture condenses creating a hazy condition and leaving the beads with a water instead of air interface. Normal daytime heat is insufficient to evaporate and expel all of this moisture through the small openings inherently present in the screening. Thus, moisture contamination occurs and blacks out the reflex-reflector within a short period of time, e.g., a few weeks to a month or even possibly as long as six months, depending upon the particular climatic conditions in which the reflector is used.

If one were to select a cover film and screen material having thermoplastic phases, and modify the Hodgson, Jr. et al. teaching by heating both the screening and cover film to thermoplasticity while simultaneously applying sufficient pressure along grid lines over only the network of screening in an effort to gain continuous seals free of minute ports and pores between areas of exposed-lens reflex-reflecting complexes, one inherently ends up erratically squashing the screening (or squashing both the screening and cover film) into areas reserved for the reflex-reflecting function; and in addition, the principle of using points of anchorage is destroyed. Under such conditions, loss of attractiveness as well as loss of required brilliance results.

The present invention, in addition to providing a new sheet material which overcomes the heretofore-unsolved problem of moisture contamination of air-exposed lens structures, provides an unusual method for forming the protected exposed-lens-type reflex-reflecting sheet material hereof. The method involves controlled "swallowing" of beads into plastic materials along fine lines without flooding or swallowing adjacent beads in a monolayer of beads. By practicing the method hereof, necessary air media is maintained about exposed lens elements for reflex-reflection; and yet permanent hermetic affixation of the transparent film over the lenticular surface of the sheeting in an interesting grid pattern is accomplished, while preserving maximum area of the sheeting for reflex-reflection function. The new method results in the formation of hermetically isolated discrete portions of exposed-lenses, with the beads of each discrete portion optically exposed and the beads between each portion optically obscured or masked by a fluid overcoating of organic resin binder. In effect, an intersecting grid pattern of pressure-formed heat-seal connections between the transparent cover film overlying the beads of the sheet material and the structure of the sheet material underlying beads thereof is accomplished, without flooding beads of the structure in areas other than those limited areas of the grid pattern of pressure-formed heat-seals.

By following the preferred teachings hereof, durable weather-resistant flexible sheeting effective as a high brilliancy reflex-reflector under wet or dry conditions and having an extraordinarily long useful life is possible. Tests more than three years old indicate that the preferred durable transparent cover film hereof will provide products having an extraordinarily long useful life, possibly as long as ten years.

An incidental point also to be made is that dirt contamination of flexible transparent cover films is as serious a problem as dirt contamination of glass beads in an exposed-lens structure (although the cover films are more easily cleaned). But it is of critical importance that water accumulation and moisture accumulation between a transparent cover film and the surface of a lenticular beaded reflector be obviated. Thus, amongst the most critical features of the present invention is that of the structural nature of the pressure-formed hermetic seal network for the transparent cover film.

For convenience in describing the invention, reference will be made to a drawing, made a part hereof, wherein.

Figure 1:
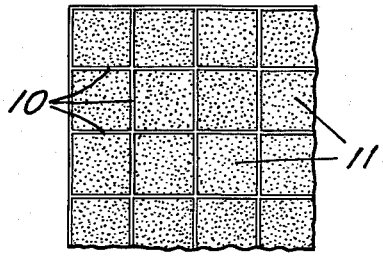
FIGURE 1 is a schematic enlarged plan view of a fragment of the sheeting hereof.

It is emphasized that the figures of the drawing hereof are merely schematic, showing the relative relationship of elements of the structure. As will be evident to those skilled in the art, glass beads in a layer of the structure rarely will be of uniform size, and the thickness of various layers of the structure may vary from area to area. The cover film may be in tangential contact with some underlying beads or not, depending on air temperature conditions as well as a host of other incidental factors.

Referring to FIGURE 1, the sheeting on its face appears to contain a series of intersecting grid lines 10 which serve to separate the face of the sheeting into "pocket" areas 11. Each pocket area 11 is isolated from adjacent pocket areas and each is characterized by exhibiting high-brilliancy reflex-reflection of incident light. The use of parallel intersecting grid lines to form hermetically isolated pockets in the sheet material is illustrated as the most convenient and attractive pattern to employ while preserving maximum optical surface areas for reflex-reflection. However, if desired, the lines of hermetic seal may be altered (i.e., may be varied in width at different parts thereof) so as to form a plurality of circular instead of rectangular or square pockets across the face of the sheeting. Oblong or triangular or other shaped pockets also may be employed so long as the critical structure here taught for hermetically isolating each pocket of reflex-reflection is maintained. Usually, the areas of each pocket of reflex-reflectivity should not have a maximum dimension in any direction parallel to the face of the sheeting greater than about ⅜ inch, although benefits of the invention are largely retained if the maximum dimension of any pocket is not greater than up to about ¾ inch. The primary reason for using pockets with dimensions no greater than some fraction of an inch (preferably no greater than about ¼ inch) is because greater dimensions for the pockets make it impossible for converters to cut the sheet material to size for application to sign surfaces, and yet retain reflex-reflectivity for substantially the whole of the area of a cut insignia under weathering conditions. Excessively large pockets, when cut through, tend to leave large border areas (i.e., the size of the remaining portion of the pocket cut through) susceptible to moisture interference, whereas smaller pockets so cut leave essentially unnoticed areas so affected.

Relatively little total front face area of my sheet material is covered by narrow line seal areas. At least a total of 60% (preferably at least 75% or 80% or even 85%) of each square foot on the front face of the sheeting is free of line seals and functions as a reflex-reflector of light. The narrowest line seals effective as hermetic barriers generally are about 1/64 of an inch wide. They should preferably be no wider than about one-fourth the maximum dimension of pockets in the sheeting.

Figure 2:
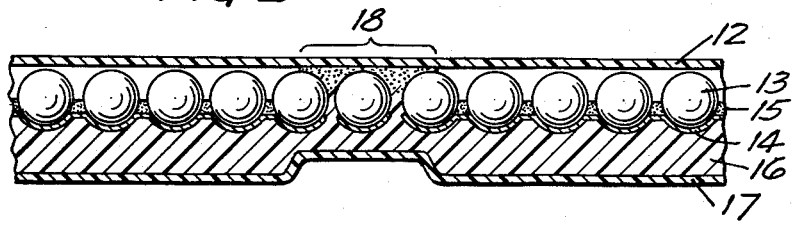
FIGURE 2 is an enlarged schematic cross-sectional view of a fragment of my sheeting, particularly showing details of a hermetic seal.

Referring now to FIGURE 2, the structure of my sheeting includes a transparent cover film 12, a layer of transparent small glass beads 13 (e.g., microspheres) with underlying reflective means 14, a binder layer 15, a further binder layer 16, and a release carrier 17 underlying binder layer 16. In addition, a critical part of the structure of the sheeting lies in the narrow line area of the hermetic seal 18, where the binder material from layer 15 for the beads in other portions of the sheet structure, and any intermingled material from layer 16, is actually forced into intimate hermetically-sealed contact with the transparent cover film 12. The small glass beads in the pattern of hermetic seal throughout the sheeting are characteristically flooded over and masked by binder material in which the glass beads of other areas of the sheeting are partially embedded.

If desired, a layer of pressure-sensitive or other suitable adhesive may be applied to the rear surface of the sheeting, together with a removable interliner.

The preferred transparent cover film 12 for the sheeting is a film of biaxially-oriented methyl methacrylate. Methyl methacrylate is highly resistant to the effects of sunlight exposure, rain, sleet, thermal shock and fungus growth. Biaxial orientation converts thin films of this material from a brittle, egg-shell state into a flexible state of good strength and handling properties. The biaxially-oriented material is particularly useful in the range of about 1 or 2 mils thick up to about 5 mils thick, where its moderate strength properties, handleability and flexibility are especially desired in combination with its resistance to crazing, cracking and discoloration. A suitable method for forming thin biaxially-oriented methyl methacrylate films is that of extending a 12–15 mil thick sheet of methyl methacrylate at about 500° F., and then stretching the film biaxially in tentering equipment at temperatures of about 270° F. so that the final film is about 3 mils thick and about two and one-half times as long and about two and one-half times as wide as the originally extruded material.

If desired, other smooth, essentially-uniformly-thick, self-supporting, transparent films such as, for example, polyethylene terephthalate ("Mylar"), cellulose acetate, cellulose acetate butyrate, etc., may be used in place of the preferred film of biaxially-oriented methyl methacrylate without departing from the essential structural features of the invention; however, such substitute films are much less durable than biaxially-oriented methyl methacrylate films and for this reason give products having a relatively short useful life as compared to products made where using the preferred transparent cover layer.

While transparent cover films no greater than 5 mils thick are preferred, the structural features of the invention, except for sacrifice of flexibility, are largely retained even when transparent cover films or sheets as thick as 10 mils or even 20 mils are employed. The most useful thickness for cover films is between about 1 and 5 mils. Such films provide maximum flexibility consistent with adequate strength and handleability.

Transparent cover films may be colored or even may consist of a laminate of materials with or without one layer of the laminate containing transparent color pigmentation.

Small glass beads 13 for the structure should not exceed about 200 microns diameter and preferably be no larger than about 75 microns diameter. They may be as small as about 10 or 15 microns in diameter, although such very small glass beads or microspheres are difficult to manufacture. Between about 25 and 75 microns diameter best results are gained. The refractive index of the beads, of course, should rest within the limits of about 1.7 to 2.0, since the compact monolayer of beads is, except for the hermetic seal pattern, exposed to air media in the final structure.

As illustrated in FIGURE 2, internal light reflecting means 14 underlie the beads in the structure in optical connection with the back extremity thereof. Suitable underlying reflecting means of the specular type, as preferred, may consist of uniformly-thick metallic deposits such as silver, aluminum, etc.

As in the teaching of U.S. Patent No. 2,326,634 to Gebhard et al., the beads of the structure in all areas of reflex-reflection are partially embedded in a binder layer 15, which suitably may be an organic resinous material. While thermosetting constituents may be employed in the binder layer 15, the layer as a whole must exhibit a thermoplastic or thermoadhesive phase so that it can be converted by heat into a viscous flowable or movable condition during hermetic sealing. Binder layers 15 and 16 of the final product should not flow at temperatures below about 150° F., where the final product is to be used in applications exposed to solar heat. By employing color pigments in the binder layers, particularly optically exposed binder layer 15, improvements in the attractiveness of the external or face appearance of the reflex-reflector may be gained.

The fundamental purpose of binder layer 16, sometimes herein referred to as a "cushion" layer, is that of providing an adequate mass of material, in combination with binder layer 15, for enveloping glass beads in those limited line pattern areas where a hermetic seal to the cover film is to be accomplished. The material of binder or cushion layer 16 may consist of the same material as that in binder layer 15; but it preferably is a material which exhibits sufficient flexibility at the thicknesses employed so as to remain unbroken or uncracked in final flexible sheet articles. Heating of limited portions of the binder layers during formation of the hermetic seal pattern serves to convert the binder layers into a viscous flowable state so that pressure applied thereto will force such material between glass beads in the limited pattern of hermetic seal and into contact with the interior surface of the transparent cover film where a vandal-resistant firm and permanent hermetic bond is formed.

Since the function of the carrier material 17 is essentially that of serving as a low adhesion or release surface to which the pattern of a heated embossing die used in manufacturing the sheeting will not stick, any of a wide variety of materials may be used as a satisfactory carrier film. For example, such materials as polyethylene terephthalate ("Mylar") films, cellulose acetate butyrate, polycarbonate, vinyl butyrate, etc. are suitable. Indeed, if desired, the carrier film 17 may be omitted from the structure, and the problem of die sticking avoided by employing a low adhesion silicone coating over die elements pressed into contact with portions of the cushion layer.

Figure 3:
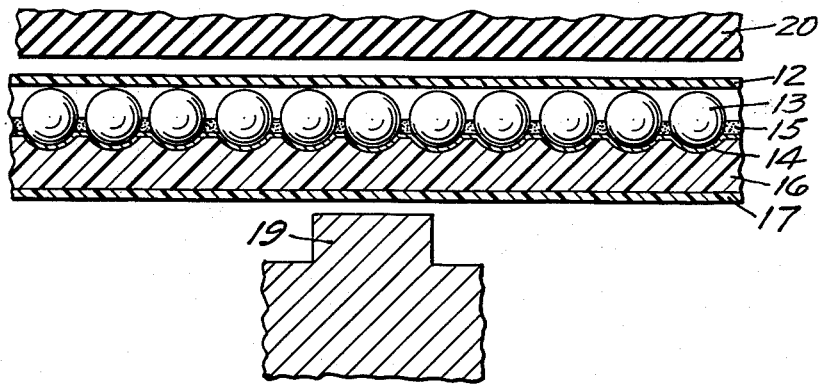
FIG. 3 is an enlarged schematic cross-sectional view illustrating the general arrangement of apparatus elements and elements of the sheet structure in position for forming the hermetic seal.

In making my sheeting, a critical step is that of laminating the transparent cover film and the reflex-reflecting structure together to form an intersecting network of narrow areas of pressure-formed hermetic seal. As may be observed by reference to FIGURE 3, die elements 19, with a projecting narrow line portion (shown in cross section in the drawing) are pressed against the deformable layers of the laminate underlying the glass bead layer thereof during formation of the hermetic seal. In this step, the side of the laminate occupied by the cover film 12 is pressed by the die elements 19 against a flat surface member 20, preferably not heated and suitably covered with rubber so as to permit yielding without loss of the moderate pressure needed for hermetic heat-sealing according to the pattern of the die elements. The die elements are heated sufficiently and pressed against the rear surface of the laminate long enough to cause heat fluidization and viscous displacement of binder material toward the cover film 12. Temperatures used for the die element and the time of pressing them against the binder material may therefore vary greatly, and are governed by the temperature at which binder material fluidizes sufficiently to move into contact with and seal to the cover film as well as the time required to reach such condition after initial die contact.

Generally the thickness of binder layers 15 and 16 should at least about equal the average diameter of the glass beads employed in the structure and may approach up to about 1½ or even 2 or possibly 3 times the diameter of the beads employed in the structure.

Where the transparent cover film selected is one which does not deform or warp or degrade under the temperature conditions required for a hermetic line-seal formation, it is suitable to accomplish lamination along the intersecting grid lines without taking special precaution to prevent the transparent cover film itself from reaching the temperatures required for the formation of a heat-seal hermetic bond. However, where uncontrolled heating of the transparent cover film occurs, danger also arises that portions of the binder or bead-bond coating adjacent lines of heat-seal may become fluidized to the point where it flows out of place and disrupts the desired reflex-reflection performance of beads in such areas. Thus, by far the most beneficial results of the invention are gained when network lamination of the cover film and underlying reflux-reflecting structure is accomplished by pressing a heated embossed die against the deformable layers of the structure underlying the glass bead layer thereof while maintaining the transparent cover film in such areas in contact with a non-heated or even cooled surface.

Another point to keep in mind is that cover films which exhibit even some thermoplasticity at the interface contacted with bead-bond material during the step of heat-sealing are preferred in that a stronger heat-fusion type of hermetic bond is thus created between the cover film and fluidized bead-bond material. But in using cover films exhibiting some thermoplasticity at elevated temperatures, loss of smoothness of the front face of the structure occurs unless the temperature of the outer surface portions of the film is kept below that where flowage or wrinkling takes place.

Emphasis has been placed on the maintaining of a generally smooth front face for the sheeting hereof; and properly so since this feature affords several advantages when considered with other characteristics of the structure. Fine silk screen printing may be accomplished over a smooth front face for the sheeting, which makes for versatility of use for the structure in signs. A smooth surface is easily wiped clean, whereas a rough one is most difficult to clean. However, where a front surface need not be so smooth as to permit silk screen printing of the finest character, and yet the irregularities of the surface are to be controlled so as to avoid crinkling or crepe-like surfacing, it is quite within the scope of the broad concept hereof to accomplish hermetic sealing along intersecting lines by using coacting die elements opposite those applied against the rear surface of the sheet structure (and identical in configuration to those applied against the rear surface) and to apply heat from die elements on one or both sides of the loose laminate during hermetic sealing. Also, if desired, a flat back-up surface may be used where heated network die elements are applied over the cover film surface to accomplish line sealing.

The following is offered as a specific illustrative example of a preferred sheeting of the invention formed according to the preferred process hereof.

Transparent glass beads having an approximate diameter from 35 to 65 microns and a refractive index of 1.92 are temporarily bonded in a polyethylene coating on kraft paper (the polyethylene coating on the paper being at a quantity of about 18 pounds per ream of 60 pound wet strength kraft paper). In accomplishing this temporary bonding, the polyethylene coated paper, with its coated side outwardly, is passed over the surface of a drum heated sufficiently to cause the polyethylene to become tacky. Simultaneously, the heat-tackified coating of polyethylene is dipped into contact with a mass of the glass beads in a trough beneath the hot drum. The tacky plastic coating causes a compact monolayer of glass beads to be picked up. Then the polyethylene coating is heated sufficiently to cause the polyethylene to soften and partially draw into it the compact monolayer of beads up to approximately 40 to 45% of their diameter (e.g., about 40 to 45% of total bead surface). The structure is then cooled, suitably by blowing room temperature air thereover.

Over the projecting beads of the polyethylene layer is then squeeze roll coated a bead-bond coating consisting of a solution of 3 parts by weight of a solid thermoplastic film-forming methyl methacrylate polymer material ("Acryloid B-72" of Rohm & Haas), with 3 parts pigment grade rutile, in 3 parts toluene and sufficient xylene to thin viscosity to about 400 cps. This coating is applied at a wet weight of about 4 grains per 24 square inches, after which solvent is evaporated by passing forced air at 120° F. over the surface.

Then the bead-bond coating is buffed with a felt of 100% wool and about 3/32 inch thick to remove bead-bond from the outermost area of the spheres (i.e., the outer approximately 20% of the total area thereof).

Aluminum is then vapor-coated over the exposed surface of the structure until a specular visually continuous coating is formed. The exposed 20% or so of the beads as well as the exposed surface of the bead-bond coating are thus reflectorized.

Thereafter, over the aluminum coating, is applied a "cushion" binder coating consisting of the following composition: About 25 parts by weight of the solid thermoplastic film-forming methyl methacrylate polymer used in the bead-bond coating, 25 parts pigment grade rutile, 6 parts of a solid thermoplastic film-forming ethyl acrylate polymer (CIOLV of Rohm & Hass), 6 parts of epoxidized soybean oil plasticizer ("Paraplex G-62" of Rohm & Haas), and 34 parts toluene. This composition is applied at a coating weight sufficient to give a dry film of about 2 to 4 mils thick over the aluminum coating, after which solvent is evaporated from the coating by forced air drying at 180° F.

A stretch-resistant film which does not become tacky at the temperatures of thermoplasticity for the "cushion" coating is then applied thereover. The film suitably is polyethylene terephthalate coated with about a 0.5 mil thick layer of methyl isoamyl acrylate (a pressure-sensitive adhesive) for adhesion to the cushion coating.

The entire structure so formed is stripped from the polyethylene coated paper carrier, and then placed with its exposed bead surface in loose contact with a 3 mil thick biaxially-oriented methyl methacrylate film. The two layers of the composite article are passed at the rate of about 10 feet per minute between a metal embossing roll heated to about 270°–300° F., and a non-heated rubber roll, with the biaxially-oriented methyl methacrylate film in contact with the non-heated rubber roll. The embossing of the metal roll suitably is that of intersecting lines in a grid pattern with ⅛ inch square open recesses defined by intersecting 1/64 inch wide lines of the pattern. The nip between the rolls is adjusted so that the two layers of the composite article are subjected to just sufficient pressure to cause material of the binder layers of the structure to move into firm hermetic bonding contact with the cover film according to the limited die contact pattern under the temperature and time conditions employed.

The cushion coating of the illustrated structure softens and flows at about 200° F.; and the bead-bond layer 15 soften and flows at about 280° F. During lamination along lines of the grid pattern, the cushion coating and compatible material of the bead binder layer 15 apparently blend together on their way to the transparent cover film. No tearing of the beaded structure of the laminate occurs; and indeed, the beads in the area of displaced binder material appear to remain essentially in the same plane as the beads in other areas. They, of course, become flooded or "swallowed" by the flowing binder material in the limited areas of seal, which results in destruction of reflex-reflectivity in those limited areas. It is significant, however, that squashing or flooding out of bead-bond material into areas of the structure other than the line areas of seal is controlled and prevented by the steps of the heat-sealing process in combination with the structural features of the product sealed.

As an incidental observation, the aluminum deposited on the bead-bond layer between the glass beads in the area of the line seals is disrupted in those areas during the formation of the hermetic line seals. This is not objectionable. (Of course, where hemispherically metallized beads are oriented in the reflex-reflector, without metal deposits underlying portions of the binder layer 15 between beads, such displacement of metal deposit as discussed for the preferred example does not occur during hermetic line sealing.)

During passage of the exposed-bead structure and cover film between the rolls, sufficient heating of the bead-bond coating occurs to effect heat fusion of that coating to the biaxially-oriented methyl methacrylate cover film in the manner of heat-seal connection; but the outer surface of the biaxially-oriented methyl methacrylate cover film usually should not be raised above about 200° F., preferably not above about 180° F. It is important, when making the preferred structure here illustrated, where a biaxially-oriented methyl methacrylate cover film is employed, to maintain the film at a temperature below its reversion temperature, which generally means that the temperature of the outer surface of the film should not exceed about 200° F. Above about 220° F., biaxially-oriented methyl methacrylate films tend to shrink and unsightly results ensue. Therefore, the biaxially-oriented methyl methacrylate film, during the step of sealing, should be maintained in contact with a relatively lower temperature surface. If necessary, the surface should be artificially cooled so as to prevent its temperature from rising to the point where heat from the heated metal embossing roll is sufficient, in combination with residual heat of the rubber roll, to elevate the temperature of the biaxially-oriented methyl methacrylate to the point of causing it to shrink or crinkle.

The product prepared as specifically illustrated has the over-all thickness of about 11 mils, and a front face appearance as shown in FIGURE 1, with an intersecting network of hermetic seal line areas between its transparent cover film and its network-displaced bead-bond coating. When placed in water and the atmosphere thereabove subjected to vacuum-pressure cycling for 25 cycles (25 inches of mercury for 15 minutes followed by 19 p.s.i. gauge pressure for 15 minutes), it stood up with no water penetration into its hermetically isolated pockets of air-exposed reflex-reflecting beads. When subjected to 25 cycles of hot-cold cycling (15 minutes in 140° F. water followed by 15 minutes in 32° F. water), it stood up without failure, i.e., without water penetration into the hermetically isolated pockets. It has been subjected to elevated temperature conditions for lengthy periods, to tropical conditions of high relative humidity and varying high temperatures, to impact tests, to arctic cold conditions, etc., and has withstood these extreme conditions without any significant moisture accumulation in hermetically isolated pockets, and without crazing, cracking or discoloration of its cover film.

An interesting feature of the sheeting is that it can easily be sealed along its cut edges (cut to form letters or other characters), when adhering it to a rigid sign base of the same size and shape, by using a vacuum and heating technique as described in Douglas U.S. Patent No. 2,620,284.

Another advantageous feature of the preferred sheeting illustrated is that it presents an attractive appearance under daytime conditions as well as exhibits brilliant reflex-reflection under nighttime conditions. Between "exposed" beads of the structure illustrated in the drawing is a pigmented binder which is optically in association with the beads, except for a small underlying specular reflective cap on each bead of the layer. Light from the sky striking the face of the structure is therefore somewhat diffused in its reflection so that an observer not in line with the incident light receives at least a portion of that light and gains a favorable impression of coloration. At the same time, an observer in line with incident light gains brilliant reflex-reflection as desired. Where beads of a layer are all equipped with hemispherical specular-reflecting caps between which the binder is pigmented, incident light is brilliantly reflex-reflected but the reflex-reflecting complexes of the layer act more as light traps in that they lack the ability to diffuse incident sky light as described for the preferred structure hereof.

In addition to noted performance features, the product exhibits a reflex-reflecting light return significantly approaching that return exhibited by an otherwise identical sheeting free of the cover film and free of the intersecting grid pattern of flooded and encapsulated beads. Specifically, the reflex-reflecting light return for the preferred product illustrated is at least two-thirds that exhibited by an otherwise identical sheet free of cover film and lines of the hermetic seal; but the product of the invention does not become blacked out under conditions which render the latter sheet material worthless as a reflex-reflector.

That which is claimed is:

1. Reflex-reflecting sheeting comprising a continuous layer of glass beads in compact relationship to one another, and means separating said layer of beads into a plurality of discrete encapsulated and hermetically sealed pockets having no lateral dimension greater than three-fourths inch, with the beads of each said discrete pocket optically exposed to an air interface, said separating means being relatively small in total area as compared to the total area of said pockets, and said separating means including an intersecting grid pattern of pressure-formed heat-sealed connection between the structure of said reflex-reflector overlying said layer of beads and the structure of said reflex-reflector underlying said layer of beads, the structure overlying said beads comprising a transparent cover film, and the structure underlying said beads comprising a binder layer in which said beads are partially embedded and internal light-reflecting means underlying said beads and in optical connection with the back extremities thereof, those beads of the sheeting in the intersecting grid pattern of pressure-formed heat-sealed connection being flooded over and optically obscured by binder layer material displaced from said binder layer and hermetically sealed to said transparent cover film according to said intersecting grid pattern.

2. Reflex-reflecting sheeting comprising a continuous layer of glass beads in compact relationship to one another and with underlying reflective means associated therewith, a transparent cover film overlying said layer of beads and unattached to a major portion thereof, a binder layer in which those beads of said continuous layer unattached to said cover film are partially embedded, and means separating said continuous layer of beads into a plurality of discrete encapuslated and hermetically sealed pockets having no lateral dimension greater than three-fourths inch, said separating means being relatively small in total area as compared to the total area of said pockets, the beads of said continuous layer located in said pockets being the beads to which said cover film is unattached, and the beads of said continuous layer between said pockets being optically obscured by part of the means which separates said continuous layer of beads into a plurality of pockets, said means including an intersecting grid pattern of pressure-formed heat-sealed connection between said overlying transparent cover film and material displaced from said binder layer and hermetically sealed in contact with said cover film between said pockets of beads.

3. Flexible reflex-reflecting sheeting of the high-brilliancy air-interface exposed-lens-type comprising a base structure and a transparent cover film overlying and hermetically sealed to said base structure according to an intersecting grid pattern forming a plurality of discrete air-filled pockets over the face of said base structure, said discrete air-filled pockets being such as to not exceed three-fourths inch in lateral dimension, the total area of hermetically sealed grid pattern being relatively small as compared to the total area of said discrete air-filled pockets, said base structure comprising a compact layer of glass beads, internal specular light-reflecting means underlying said beads, and a thermoadhesive binder layer in which beads of the base structure located in the aforesaid pockets are partially embedded, and in which beads of the base structure located in the aforesaid intersecting grid pattern are fully embedded and optically obscured, said intersecting grid pattern of said sheeting being formed by material dipslaced from said binder layer and hermetically sealed to said transparent cover film according to said grid pattern.

4. Reflex-reflecting sheeting comprising a transparent cover film, a plurality of discrete reflex-reflecting pockets of air-exposed glass beads in a monolayer with associated underlying reflective means located behind said cover film, a binder layer in which glass beads of said pockets are partially embedded and to which said transparent cover film is hermetically sealed according to an intersecting grid pattern between said discrete reflex-reflecting pockets, the lateral dimensions of said discrete reflex-reflecting pockets being not in excess of three-fourths inch, with the total area of the hermetically sealed grid pattern of said structure being relatively small as compared to the total area of said discrete reflex-reflecting pockets, the intersecting grid pattern of hermetic seal between said cover film and binder layer being further characterized by the presence of glass beads fully embedded and optically obscured by binder layer material displaced from said binder layer into sealed contact with said cover film according to said grid pattern.

5. Reflex-reflecting sheeting comprising a continuous layer of glass beads in compact relationship to one another, and means separating said layer of beads into a plurality of discrete encapsulated and hermetically sealed pockets having no lateral dimension greater than three-fourths inch, with the beads of each said discrete pocket optically exposed to an air interface, said separating means being relatively small in total area as compared to the total area of said pockets, and said separating means including an intersecting grid pattern of pressure-formed heat-sealed connection between the structure of said reflex-reflector overlying said layer of beads and the structure of said reflex-reflector underlying said layer of beads, the structure overlying said beads comprising a transparent biaxially-oriented methyl methacrylate cover film, and the structure underlying said beads comprising a binder layer in which said beads are partially embedded and internal light-reflecting means underlying said beads and in optical connection with the back extremities thereof, those beads of the sheeting in the intersecting grid pattern of pressure-formed heat-sealed connection being flooded over and optically obscured by binder layer material dipslaced from said binder layer and hermetically sealed to said transparent cover film according to said intersecting grid pattern.

References Cited by the Examiner

UNITED STATES PATENTS

| | | | |
|---|---|---|---|
| 2,218,909 | 10/40 | Gill | 117—21 |
| 2,568,126 | 9/51 | Keeley | 156—298 |
| 2,592,882 | 4/52 | Fisher et al. | 88—82 |
| 2,948,191 | 8/60 | Hodgson et al. | 88—82 |
| 2,952,192 | 9/60 | Nagin | 94—1.5 |
| 3,005,382 | 10/61 | Weber | 88—82 |
| 3,043,196 | 7/62 | Palmquist et al. | 88—82 |
| 3,065,559 | 11/62 | McKenzie | 88—82 X |
| 3,140,340 | 7/64 | Weber | 88—82 |

JEWELL H. PEDERSEN, *Primary Examiner.*

EMIL G. ANDERSON, *Examiner.*

UNITED STATES PATENT OFFICE
CERTIFICATE OF CORRECTION

Patent No. 3,190,178                           June 22, 1965

Eugene L. McKenzie

It is hereby certified that error appears in the above numbered patent requiring correction and that the said Letters Patent should read as corrected below.

Column 1, line 25, for "2.0 maximum" read -- 2.0 for maximum --; line 34, for "angle" read -- angles --; line 55, for "protometer" read -- photometer --; column 2, line 10, for "contact at" read -- contact air at --; line 21, for "shaps" read -- shapes --; line 58, for "air-interference" read -- air-interface --; line 61, for "in" read -- is --; column 3, line 15, for "its" read -- it --; line 66, for "interesting" read -- intersecting --; column 5, line 45, for "extending" read -- extruding --; column 7, line 34, for "reflux-reflecting" read -- reflex-reflecting --; column 12, line 29, for "dipslaced" read -- displaced --.

Signed and sealed this 29th day of November 1966.

(SEAL)
Attest:

ERNEST W. SWIDER                                EDWARD J. BRENNER
Attesting Officer                            Commissioner of Patents